UNITED STATES PATENT OFFICE 2,435,621

METHOD OF PURIFYING A HYDROCARBON MATERIAL CONTAINING ORGANIC HALOGEN COMPOUNDS AS IMPURITIES

John W. Brooks, Wenonah, and James B. Kirkpatrick, Woodbury, N. J., assignors to Socony-Vacuum Oil Company, Incorporated, a corporation of New York No Drawing. Application September 30, 1943, Serial No. 504,436

9 Claims. (Cl. 196—36)

This invention relates to a method for removing organic halogen compounds from hydrocarbon materials containing such compounds, and is more particularly concerned with a method of producing high-octane blending agents for the manufacture of aviation gasoline, by removing organic halogen compounds from hydrocarbon alkylates obtained by the alkylation of paraffinic hydrocarbons with olefinic hydrocarbons in the presence of halogen-containing alkylation catalysts and promoters.

It is well known in the art that the ever-increasing demand for super fuels has been met, to a considerable extent, by synthetic fuels, among which, blends of varying amounts of constituents or blending agents, each having characteristic properties as a motor fuel, are among the most important. Thus, a very satisfactory aviation gasoline is a blend of isopentane, selected aviation base stock, and a sufficient amount of a high-octane constituent so that the blend will have the specified octane rating with the permissible maximum amount of lead tetraethyl fluid.

The high-octane constituent or blending agent is the most important ingredient of blends used as aviation gasoline. Several methods are known in the art for producing satisfactory high-octane blending agents. Polymerization of olefinic hydrocarbons with subsequent hydrogenation of the polymers was one of the first commercial processes used for this purpose. Alkylation processes, wherein paraffinic hydrocarbons are directly combined with olefinic hydrocarbons to produce a product called the hydrocarbon alkylate, were a later development for the purpose of furnishing high-octane blending agents. Today, alkylation processes supply a considerable portion of high-octane blending agents in the form of hydrocarbon alkylates.

Alkylation may be conducted at elevated temperatures and pressures, or may be conducted advantageously in the presence of alkylation catalysts, at lower temperatures and pressures. The two methods are known in the art as thermal alkylation and catalytic alkylation, respectively.

Several types of alkylation catalysts are known. For instance, it is known to alkylate isoparaffinic hydrocarbons with olefinic hydrocarbons in the presence of sulfuric acid, phosphoric acid, metal phosphates, metal halides, activated clays and the like, as alkylation catalysts. In these catalytic alkylation processes, the hydrocarbon reactants form with the alkylation catalysts, a heterogeneous system during the alkylation operation. This type of alkylation catalysts may be referred to, therefore, as heterogeneous alkylation catalysts. On the other hand, a copending application, Ser. No. 502,018, filed September 11, 1943, now Patent No. 2,410,107, describes the use of alkylation catalysts that form with the hydrocarbon reactants, a single, homogeneous gaseous phase under the conditions of the alkylation operation. This latter type of alkylation catalysts may be referred to, therefore, as homogeneous gaseous phase alkylation catalysts, in contradistinction to the alkylation catalysts of the first type referred to hereinbefore. The alkylation catalyst specifically mentioned in this copending application are alkyl halides, and more particularly chlorine and bromine derivatives of light hydrocarbons. Another copending application, Ser. No. 502,812, filed September 17, 1943, now Patent No. 2,410,071, in which one of the inventors of the present application is a coinventor, is directed specifically to the use of elemental halogens, and more particularly, chlorine and bromine, as homogeneous gaseous phase alkylation catalysts.

The high-octane hydrocarbon alkylates obtained in catalytic alkylation processes that employ the use of metal halides, alkyl halides or elemental halogens, broadly, halogen-containing alkylation catalysts, are contaminated with small amounts of halogens, for the most part present as organic halides. These compounds impart to the hydrocarbon alkylates, a negative susceptibility to lead tetraethyl fluid. Since in the manufacture of aviation gasoline, lead tetraethyl fluid is added to the blend containing the high-octane hydrocarbon alkylate, to produce a fuel having a specified octane rating, as explained hereinbefore, it is manifest that this negative response to lead tetraethyl fluid must be eliminated from the hydrocarbon alkylates, to ultimately avoid it in the blend. It is obvious, therefore, that hydrocarbon alkylates possessing a negative response to lead tetraethyl fluid are not suitable as high-octane blending agents and hence, may not be properly termed, high-octane blending agents.

Hydrocarbon alkylates are complex mixtures of a multiplicity of hydrocarbon compounds. Depending upon the nature of the hydrocarbon reactants, the alkylation conditions and the manner in which the alkylation process is carried out, the hydrocarbon alkylate may contain minor or major amounts of multi-branched paraffinic hydrocarbons which are the most desirable constituents and the object of the alkylation operation, residual olefinic reactant and paraffinic reactant, aromatic hydrocarbons resulting from side reactions, low molecular weight hydrocarbons produced by degradation of the reactants, high molecular weight hydrocarbons resulting from polymerization of the olefinic reactant, and other impurities produced by the reaction of these hydrocarbon compounds with the alkylation catalyst, during the alkylation operation. Accordingly, the hydrocarbon alkylates obtained in alkylation processes that involve the use of metal halides, alkyl halides or of elemental halogens as alkylation catalysts, contain inter alia, alkyl halides varying from $CH_3Cl$ or $CH_3Br$ to considerably higher boiling halides. Since the hydrocarbon alkylates may contain numerous alkyl halides the boiling points of which vary between the initial boiling points of the hydrocarbon alkylates and the end points thereof, it is impossible to remove them by distillation.

As is well known to those familiar with the art, several processes have been proposed for removing organic halogen compounds, particularly organic chlorides, from hydrocarbon materials containing such compounds. All of these processes involve the decomposition of the organic halides and removal of the halogen in the form of the corresponding halogen acid. Generally speaking, all of these methods are vapor or liquid phase methods and involve the use of elevated temperatures, on the order of 300° F. and over, for the decomposition and removal of the organic halides. It has also been suggested to carry out the heat treatment in the presence of catalysts such as coke, silicates, chlorides of various metals, and the like. In practice, these catalysts become inactive after a period of use, hence, periodic regeneration of the catalysts becomes necessary. This, of course, involves high initial and operation costs.

We have found that organic halogen compounds may be eliminated from hydrocarbon materials containing such compounds, by treatment of the hydrocarbon materials with ammonia.

It is an object of the present invention to provide an efficient method of removing organic halogen compounds from hydrocarbon materials containing such compounds. Another object of the present invention is to provide an efficient yet simple method of removing organic halogen compounds from hydrocarbon alkylates obtained in the catalytic alkylation of paraffinic hydrocarbons with olefinic hydrocarbons, involving the use of halogen-containing alkylation catalysts. A very important object of our invention is to provide a method of producing high-octane blending agents for the manufacture of aviation gasoline, from hydrocarbon alkylates obtained in the catalytic alkylation of paraffinic hydrocarbons with olefinic hydrocarbons, involving the use of halogen-containing alkylation catalysts. A more specific object is to afford a method capable of carrying out the above objects by treating the hydrocarbon materials containing the organic halogen compounds with ammonia. Other objects and advantages of the present invention, will become apparent to those skilled in the art from the following description.

Broadly stated, our invention provides a method of removing organic halogen compounds from hydrocarbon materials containing such compounds, and more particularly, from hydrocarbon alkylates obtained in the catalytic alkylation of paraffinic hydrocarbons with olefinic hydrocarbons, involving the use of metal halides, alkyl halides or elemental halogens, which comprises contacting the halogen-containing hydrocarbon materials with ammonia in a reaction zone at elevated temperatures and pressures.

Under these conditions, the ammonia reacts with the alkyl halides present in the hydrocarbon materials undergoing treatment, in two ways, one resulting in the formation of amines, and the other yielding olefinic hydrocarbons:

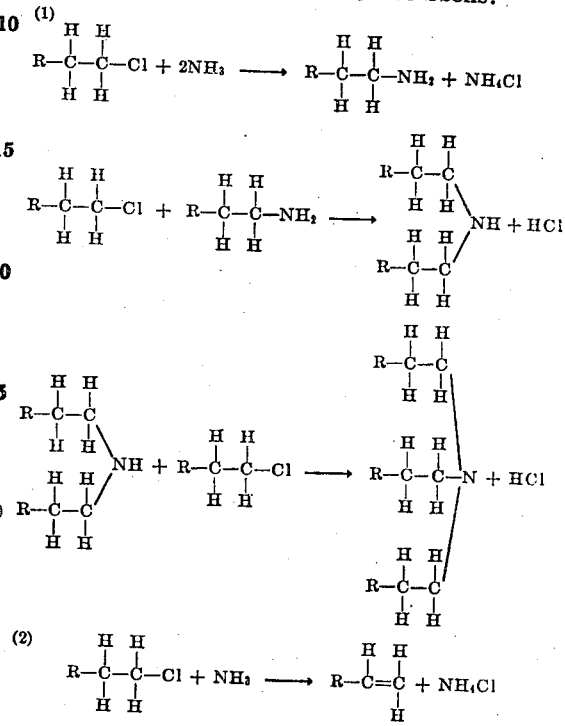

A feature of the method of the present invention is that under the conditions of treatment, ammonia has no harmful effects on the multibranched paraffinic hydrocarbon constituents of the hydrocarbon alkylate.

A very important feature is that the halogens are removed substantially completely, only traces remaining, on the order of 0.05%, the hydrocarbon materials showing after treatment, a negative hot Beilstein test, thereby insuring a product having good response to lead tetraethyl fluid.

In accordance with the method of the present invention, either anhydrous ammonia or an aqueous solution of ammonia may be used. When anhydrous ammonia is employed, both the ammonia and the hydrocarbon materials should be in the vapor phase to insure better contact between the reactants. The ammonium chloride formed in the reaction may cause mechanical and manipulative difficulties, by depositing in the reaction chamber and thereby clogging the apparatus. These difficulties may be advantageously eliminated by using an aqueous solution of ammonia, for instance, a 10% solution, and conducting the reaction so that the water is in the liquid phase. Under these conditions, the water will dissolve the ammonium chloride formed and will maintain the reaction chamber clear.

The temperature to be used in the treatment of halogen-containing hydrocarbon materials with ammonia depends upon whether anhydrous ammonia or whether an aqueous solution of ammonia is used. When anhydrous ammonia is employed, the temperature varies between about 400° F. and about 800° F. When an aqueous solution of ammonia is employed, the temperature varies between about 400° F. and about 700° F. The pressure to be used likewise depends upon whether anhydrous ammonia is used and the treatment is carried out in the vapor phase, or whether an aqueous solution of ammonia is employed and the treatment is carried out so that the water is in the liquid phase. When the treatment is conducted in the vapor phase, pressures varying between about 100 pounds per square inch and about 500 pounds per square inch are used. Generally speaking, when the treatment is carried out with aqueous ammonia so that the water is in the liquid phase, the pressure must be of such magnitude as to be greater than the vapor pressure of water at the temperature of treatment. Hence, the temperature of treatment must be below the critical temperature of water.

As noted hereinbefore, amines will be formed during the interaction of alkyl halides and ammonia. In treating halogen-containing hydrocarbon alkylates with ammonia, we have found that amines have very little effect on the response of the treated hydrocarbon alkylates to lead tetraethyl fluid, when present in concentrations of up to 4%. If the amines are undesirable in the treated hydrocarbon alkylate, they can be eliminated therefrom by extraction with an acid wash. For example, when an aqueous solution of ammonia is used, some of the lower molecular weight amines that are formed, such as methyl and ethyl amines, are soluble in water and insoluble in the hydrocarbons. These amines will remain in the aqueous solution of ammonia and are recycled with the aqueous solution of ammonia during the dehalogenation treatment. During the recycling process, these amines will react with the halides present in the hydrocarbons undergoing treatment, to form secondary and tertiary amines, as noted hereinbefore. These secondary and tertiary amines are much more soluble in the hydrocarbons than the primary amines which were initially formed, and they will be dissolved by the hydrocarbons. On the other hand, the higher molecular weight amines that are formed, will separate from the aqueous solution of ammonia due to their lower specific gravity and to their partial solubility in the hydrocarbons. At the end of the dehalogenation treatment, the hydrocarbons containing the scondary and tertiary amines and the higher molecular weight amines, will separate from the aqueous solution of ammonia to form a hydrocarbon layer. This hydrocarbon layer can be washed with dilute acid, such as dilute sulfuric acid. The acid extracts the amines from the hydrocarbons to form with the amines, a water soluble salt. The acid solution may be evaporated to produce a residue containing the amine salts. Neutralization of the residue with alkali will yield the amines. The mixture may then be distilled to obtain the specific amines desired.

To illustrate our invention, we set forth in the following table, typical data obtained in carrying out our method:

Table

| Per cent chlorine by weight in hydrocarbon alkylate | Ammonia | Temperature of Treatment, °F. | Pressure of Treatment, lbs. per sq. in. | Per cent chlorine by weight in treated hydrocarbon alkylate |
|---|---|---|---|---|
| 2 | anhydrous | 730 | 200 | 0.05 |
| 1.54 | 10% aqueous solution | 600 | 2,500 | 0.05 |

Although the present invention has been described in conjunction with preferred embodiments, it is to be understoood that modifications and variations may be resorted to without departing from the spirit and scope of the invention, as those skilled in the art will readily understand. Such variations and modifications are considered to be within the purview and scope of the appended claims.

We claim:
1. The method of purifying a hydrocarbon material containing organic halogen compounds as impurities, which comprises contacting said halogen-containing hydrocarbon material with a substance selected from the group consisting of anhydrous ammonia and an aqueous solution of ammonia, at a temperature varying between about 400° F. and about 800° F., and at a pressure in excess of about 100 pounds per square inch.

2. The method of purifying a hydrocarbon material containing organic halogen compounds as impurities, which comprises contacting said halogen-containing hydrocarbon material with an aqueous solution of ammonia, at a temperature varying between about 400° F. and about 700° F., and at a pressure greater than the vapor pressure of water at the temperature of treatment.

3. The method of purifying a hydrocarbon alkylate containing organic halogen compounds as impurities and obtained in alkylation operations carried out in the presence of halogen-containing alkylation catalysts, which comprises contacting said hydrocarbon alkylate with an aqueous solution of ammonia, at a temperature varying between about 400° F. and about 700° F., and at a pressure greater than the vapor pressure of water at the temperature of treatment.

4. The method of purifying a hydrocarbon alkylate containing organic halogen compounds as impurities and obtained in alkylation operations carried out in the presence of halogen-containing homogeneous gaseous phase alkylation catalysts, which comprises contacting said hydrocarbon alkylate with an aqueous solution of ammonia at a temperature varying between about 400° F. and about 700° F., and at a pressure greater than the vapor pressure of water at the temperature of treatment.

5. The method of purifying hydrocarbon alkylate containing organic halogen compounds as impurities and obtained by alkylating isobutane with propylene in the presence of halogen-containing homogeneous gaseous phase alkylation catalysts, which comprises contacting said hydrocarbon alkylate with an aqueous solution of ammonia, at a temperature varying between about 400° F. and about 700° F., and at a pressure greater than the vapor pressure of water at the temperature of treatment.

6. The method of purifying a hydrocarbon material containing organic halogen compounds as impurities, which comprises contacting said halogen-containing hydrocarbon material in vapor phase, with anhydrous ammonia at a temperature varying between about 400° F. and about 800° F., and at a pressure varying between about 100 pounds per square inch and about 500 pounds per square inch.

7. The method of purifying a hydrocarbon alkylate containing organic halogen compounds as impurities and obtained in alkylation operations carried out in the presence of halogen-containing alkylation catalysts, which comprises contacting said hydrocarbon alkylate in vapor phase, with anhydrous ammonia at a temperature varying between about 400° F. and about 800° F., and at a pressure varying between about 100 pounds per square inch and about 500 pounds per square inch.

8. The method of purifying a hydrocarbon alkylate containing organic halogen compounds as impurities and obtained in alkylation operations carried out in the presence of halogen-containing homogeneous gaseous phase alkylation catalysts, which comprises contacting said hydrocarbon alkylate in vapor phase, with anhydrous ammonia at a temperature varying between about 400° F. and about 800° F., and at a pressure varying between about 100 pounds per square inch and about 500 pounds per square inch.

9. The method of purifying a hydrocarbon alkylate containing organic halogen compounds as impurities and obtained by alkylating isobutane with propylene in the presence of halogen-containing homogenous gaseous phase alkylation catalysts, which comprises contacting said hydrocarbon alkylate in vapor phase, with anhydrous ammonia at a temperature varying between about 400° F. and about 800° F., and at a pressure varying between about 100 pounds per square inch and about 500 pounds per square inch.

JOHN W. BROOKS.
JAMES B. KIRKPATRICK.

REFERENCES CITED

The following references are of record in the file of this patent:

UNITED STATES PATENTS

| Number | Name | Date |
|---|---|---|
| 2,310,837 | Carpenter | Feb. 9, 1943 |
| 2,106,976 | McArthur et al. | Feb. 1, 1938 |
| 2,193,417 | Gage | Mar. 12, 1940 |
| 1,832,534 | Curme | Nov. 17, 1931 |
| 1,992,489 | Keller | Feb. 26, 1935 |
| 1,715,095 | Morrell et al. | May 28, 1929 |
| 1,774,559 | McAfee et al. | Sept. 2, 1930 |
| 1,869,781 | Shiffler et al. | Aug. 2, 1932 |
| 2,322,800 | Frey | June 29, 1943 |
| 2,376,088 | Robinson | May 15, 1945 |
| 2,363,264 | Rosen | Nov. 21, 1944 |
| 2,030,307 | MacLaren | Feb. 11, 1936 |